US012098825B2

(12) United States Patent
Zhao

(10) Patent No.: US 12,098,825 B2
(45) Date of Patent: Sep. 24, 2024

(54) CEILING-MOUNTED LIGHTING SYSTEM

(71) Applicant: Xueliang Zhao, Ningbo (CN)

(72) Inventor: Xueliang Zhao, Ningbo (CN)

( * ) Notice: Subject to any disclaimer, the term of this patent is extended or adjusted under 35 U.S.C. 154(b) by 0 days.

(21) Appl. No.: 18/477,309

(22) Filed: Sep. 28, 2023

(65) Prior Publication Data

US 2024/0019108 A1 Jan. 18, 2024

(51) Int. Cl.
*F21V 21/04* (2006.01)
*F21S 8/02* (2006.01)
*F21Y 115/10* (2016.01)

(52) U.S. Cl.
CPC ............ *F21V 21/045* (2013.01); *F21S 8/026* (2013.01); *F21Y 2115/10* (2016.08)

(58) Field of Classification Search
CPC ...... F21V 21/045; F21S 8/026; F21Y 2115/10
See application file for complete search history.

(56) References Cited

U.S. PATENT DOCUMENTS 9,416,535 B1 * 8/2016 Yaphe ..................... E04B 9/006
2015/0267873 A1 9/2015 Price et al.
2016/0138789 A1 5/2016 Brown
2016/0377245 A1 12/2016 Yaphe et al.
2019/0301691 A1 * 10/2019 Yaphe ....................... F21V 7/05
2021/0003269 A1 * 1/2021 Wang .................... F21V 21/045
2024/0125463 A1 * 4/2024 Zhao ....................... F21S 2/005

FOREIGN PATENT DOCUMENTS

TW 201122331 A * 7/2011

* cited by examiner

*Primary Examiner* — Tracie Y Green

(57) ABSTRACT

The present invention claims a ceiling-mounted lighting system, comprising a lighting fixture installation area, a ceiling lighting fixture, first elastic fasteners, and second elastic fasteners. A mounting hole is provided in the lighting fixture installation area. The ceiling lighting fixture is installed in the mounting hole through the first elastic fasteners and the second elastic fasteners to facilitate removal and installation of the ceiling lighting fixture. After installation, a back edge of a lighting portion of the ceiling lighting fixture is attached to the lighting fixture installation area, which can achieve a shockproof effect. As the ceiling lighting fixture can be suspended at the 6 o'clock position on the mounting hole, it is convenient to connect lighting fixture wires to mains cables above the ceiling.

12 Claims, 8 Drawing Sheets

CEILING-MOUNTED LIGHTING SYSTEM

TECHNICAL FIELD

The present invention belongs to the field of lighting fixtures, specifically relating to a ceiling-mounted lighting system.

BACKGROUND

Recessed grille lamps, troffer lights, and indirect troffers are appliances necessary for commercial lighting and public lighting. It is suitable for them to be embedded in the keel ceiling and embedded in gypsum boards through on-site opening. Since such lighting fixtures have been widely used, people's requirements for aesthetics after installation and the convenience of installing lamps in gypsum board through opening are continuously improved. Existing embedded installation methods of lighting fixtures cannot meet people's installation requirements. There are two methods in the prior art: one is to use vertical spring buckles. On the one hand, personal injury may be caused during installation and disassembly; on the other hand, the torsional moment of the vertical spring is too small to pass the strain relief durability required by safety regulations such as UL/CCC/CE. The other is to use T-shaped buckles for installation from the inside of lighting fixtures. It is necessary to remove lampshades and other components of lighting fixtures during the installation of T-shaped buckles, so the installation is complex and time-consuming. In addition, the ceiling is high and the space above the mounting hole is narrow, so a plurality of people are required for the installation together and need to be professional.

SUMMARY

The present invention is to provide a ceiling-mounted lighting system that facilitates removal or installation of lighting fixtures.

The ceiling-mounted lighting system designed by the present invention comprises a lighting fixture installation area, a ceiling lighting fixture, first elastic fasteners, and second elastic fasteners. A mounting hole is provided in the lighting fixture installation area. The ceiling lighting fixture comprises a lighting portion, and a first mounting portion and a second mounting portion behind the lighting portion. The first mounting portion and the second mounting portion are arranged opposite to each other, and the appearance of the mounting hole is the same as that of the lighting portion. There is a first inner wall and a second inner wall on the mounting hole, and the first inner wall and the second inner wall are arranged opposite to each other. The first mounting portion is arranged on the same side as the first inner wall, and first mounting pieces are arranged on the first inner wall. The second mounting portion is arranged on the same side as the second inner wall, and second mounting pieces are arranged on the second inner wall. Both the first mounting pieces and the second mounting pieces are provided with clamping holes. The first elastic fasteners are slidably connected to the clamping holes of the first mounting pieces, and connecting portions of the first elastic fasteners are detachably connected to the first mounting portion. The second elastic fasteners are slidably connected to the clamping holes of the second mounting pieces, and connecting portions of the second elastic fasteners are detachably connected to the second mounting portion. When a back edge of the lighting portion is attached to the lighting fixture installation area, an opening edge is formed at the upper end of each of the clamping holes. Elastic clamping portions of the first elastic fasteners pass through the clamping holes on the first mounting pieces and are clamped on the opening edges of the first mounting pieces or clamping surfaces of the first mounting pieces. Elastic clamping portions of the second elastic fasteners pass through the clamping holes on the second mounting pieces and are clamped on the opening edges of the second mounting pieces.

According to the ceiling-mounted lighting system described above, connecting pieces are installed on both the first mounting portion and the second mounting portion. Each of the connecting pieces is provided with an upper spring piece and lower spring pieces. Both the upper spring piece and the lower spring pieces are arranged obliquely. The lower spring pieces and the upper spring piece are staggered or opposite. Outer ends of the upper spring piece and the lower spring pieces are arranged close to each other; The first elastic fasteners and the second elastic fasteners both comprise a clamping rod. The clamping rod of the first elastic fasteners is located between the upper spring piece and the lower spring pieces of the first mounting portion, and the clamping rod of the second elastic fasteners is located between the upper spring piece and the lower spring pieces of the second mounting portion.

According to the ceiling-mounted lighting system described above, both the first elastic fasteners and the second elastic fasteners further comprise two elastomers and elastic strips arranged on elastomers. The two elastomers are respectively arranged at both ends of the clamping rod, and the upper end of each of the elastic strips is bent to form the elastic clamping portion.

According to the ceiling-mounted lighting system described above, arc-shaped bend segments are formed by extending outer ends of the elastic clamping portions, and hook portions are formed by extending outer ends of the arc-shaped bend segments. The elastic strips, the elastic clamping portions, the arc-shaped bend segments, and the hook portions are combined with each other to form integrated elastic connecting strips.

According to the ceiling-mounted lighting system described above, a section of the upper spring piece is in an "L" shape, and a lower end of a short piece portion of the upper spring piece serves as an outer end of the upper spring piece. An extension portion extending outwardly is formed on the outer end of the upper spring piece, and the extension portion is arranged obliquely.

According to the ceiling-mounted lighting system described above, included angles between a long piece portion of the upper spring piece and an outer wall surface of the connecting pieces and between the lower spring pieces and the outer wall surface of the connecting pieces are acute angles, and the extension portion and the short piece portion of the upper spring piece are arranged perpendicular to each other.

According to the ceiling-mounted lighting system described above, in a state where the lighting portion is attached to the lighting fixture installation area, the two elastic strips of the first elastic fasteners are unfolded and inserted into the clamping holes of the first mounting pieces, and the two elastic clamping portions of the first elastic fasteners are respectively clamped on the clamping surfaces of the first mounting pieces. The included angles between the two elastic strips of the first elastic fasteners and the clamping rod of the first elastic fasteners are obtuse angles, and the included angles between the two elastic strips of the first elastic fasteners and the elastic clamping portions of the first elastic fasteners are obtuse angles, right angles or acute angles. The two elastic strips of the second elastic fasteners are unfolded and inserted into the clamping holes of the second mounting pieces, and the two elastic clamping portions of the second elastic fasteners are respectively clamped on the clamping surfaces of the second mounting pieces. The included angles between the two elastic strips of the second elastic fasteners and the clamping rod of the second elastic fasteners are obtuse angles, and the included angles between the two elastic strips of the second elastic fasteners and the elastic clamping portions of the second elastic fasteners are obtuse angles, right angles or acute angles.

According to the ceiling-mounted lighting system described above, in a state where the lighting portion is far away from the lighting fixture installation area, the two elastic connecting strips of the first elastic fasteners are close to each other and inserted into the clamping holes of the first mounting pieces, and the hook portions on the first elastic fasteners are clamped on the clamping surfaces of the first mounting pieces. The included angles between the two elastic strips of the first elastic fasteners and the clamping rod of the first elastic fasteners are acute angles, and the included angles between the two elastic clamping portions of the first elastic fasteners and the elastic strips of the first elastic fasteners are obtuse angles. The two elastic connecting strips of the second elastic fasteners are close to each other and inserted into the clamping holes of the second mounting pieces, and the hook portions on the second elastic fasteners are clamped on the clamping surfaces of the second mounting pieces. The included angles between the two elastic strips of the second elastic fasteners and the clamping rod of the second elastic fasteners are acute angles, and the included angles between the two elastic clamping portions of the second elastic fasteners and the elastic strips of the second elastic fasteners are obtuse angles.

According to the ceiling-mounted lighting system described above, a first mounting plate is fixed on the first inner wall and a second mounting plate is fixed on the second inner wall. The first mounting pieces are arranged on the first mounting plate and the second mounting pieces are arranged on the second mounting plate.

According to the ceiling-mounted lighting system described above, both the mounting hole and the lighting portion are of a square structure, and at least one of the length and width of the lighting portion is greater than those of the mounting hole.

According to the ceiling-mounted lighting system described above, inside edges of the first mounting pieces and the second mounting pieces extend upward to form baffles.

According to the ceiling-mounted lighting system described above, the lighting fixture installation area comprises a ceiling and a keel frame. The keel frame comprises two spaced keels arranged opposite each other. After a square hole is formed in the ceiling, the two keels are fixed on a top surface of the ceiling, and side walls of the two keels facing the mounting hole are located flush with two opposite inner walls of the square hole respectively. The square hole forms the mounting hole with the two keels, and the side walls of the two keels facing the mounting hole serve as the first inner wall and the second inner wall respectively.

The ceiling-mounted lighting system according to the present invention has the following beneficial effects:

1. During installation, the two elastic connecting strips of the first elastic fasteners may be close to each other and inserted into the clamping holes of the first mounting pieces, and the hook portions on the first elastic fasteners are clamped on the clamping surfaces of the first mounting pieces. The two elastic connecting strips of the second elastic fasteners are close to each other and inserted into the clamping holes of the second mounting pieces, and the hook portions on the second elastic fasteners are clamped on the clamping surfaces of the second mounting pieces. The ceiling lighting fixture is then moved to a 6 o'clock position on the mounting hole. At this time, the connecting portions of the two elastic fasteners are detachably connected to the connecting pieces of the first mounting portion and the second mounting portion respectively. Finally, the back edge of the lighting portion of the ceiling lighting fixture is directly pushed upward to be attached to the lighting fixture installation area. In this way, the two elastic connecting strips on the first and second elastic fasteners can be unfolded, and the elastic clamping portions are clamped on the clamping surfaces of the mounting pieces, thus facilitating the installation.
2. During removal, an outer edge of the lighting fixture can be directly pulled down to keep the embedded lighting fixture away from the lighting fixture installation area/gypsum boards. The two elastic connecting strips on the first and second elastic fasteners are close to each other, and tops of the two elastic connecting strips at each position are also inserted into the clamping holes of the mounting pieces so that the hook portions are clamped on the clamping surfaces of the mounting pieces. Finally, the two elastic connecting strips are pressed relatively to push the hook portions to separate from the clamping surfaces of the mounting pieces and enter the clamping holes. At this time, the ceiling lighting fixture can be removed from the ceiling simply.
3. The back edge of the lighting portion of the ceiling lighting fixture after installation is attached to the lighting fixture installation area, which can achieve a shockproof effect.
4. As the ceiling lighting fixture can be suspended at the 6 o'clock position on the mounting hole, it is convenient to connect lighting fixture wires to mains cables above the ceiling.

BRIEF DESCRIPTION OF DRAWINGS

For a better understanding of the embodiments of the disclosure or the technical

Figure 1:
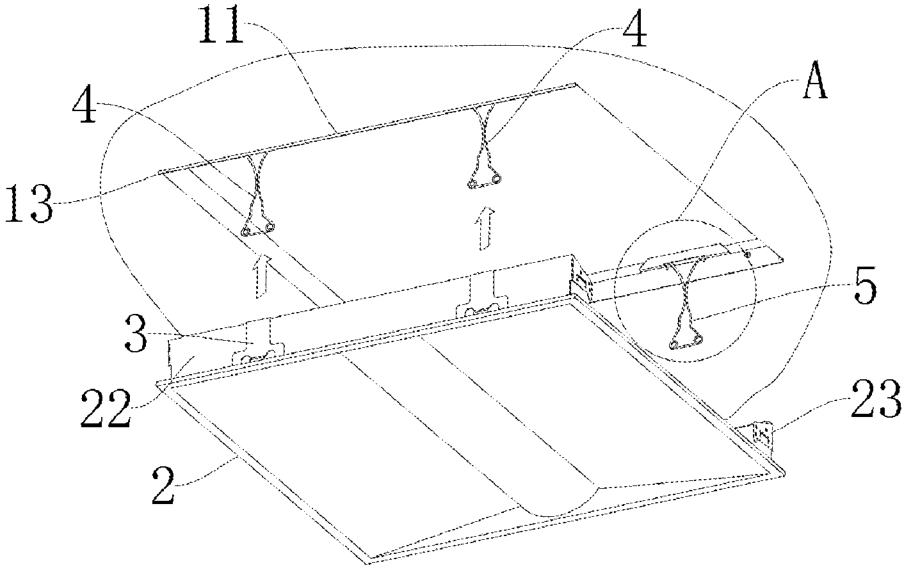
FIG. 1 is a schematic diagram (I) of an overall structure of the present invention.
Figure 2:
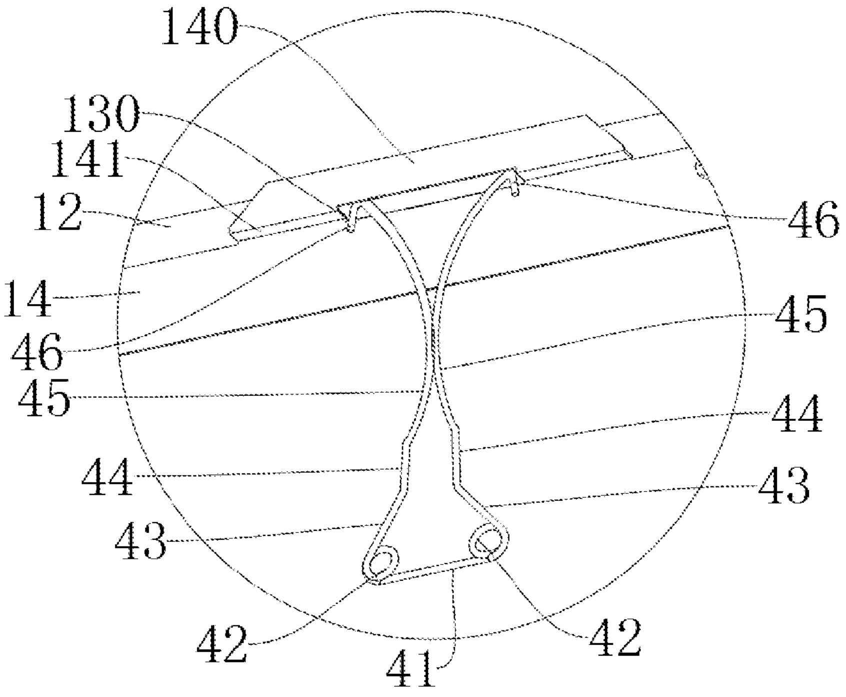
FIG. 2 is an enlarged view of Position A.
Figure 3:
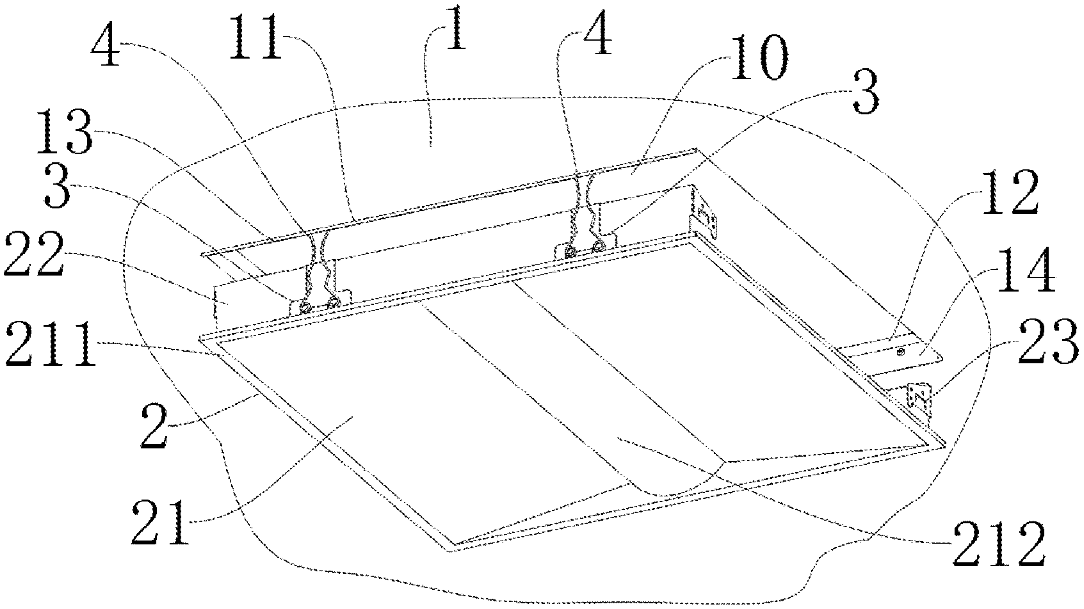
FIG. 3 is a schematic diagram (II) of the overall structure of the present invention.
Figure 4:
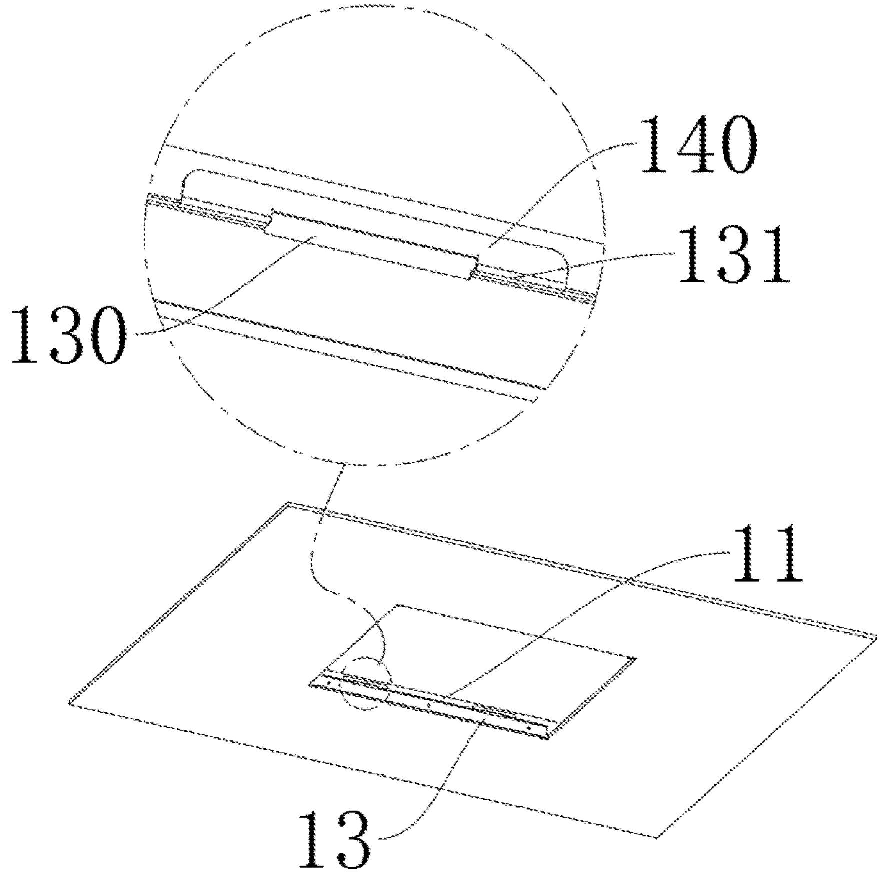
FIG. 4 is a structural diagram (I) of a lighting fixture installation area.
Figure 5:
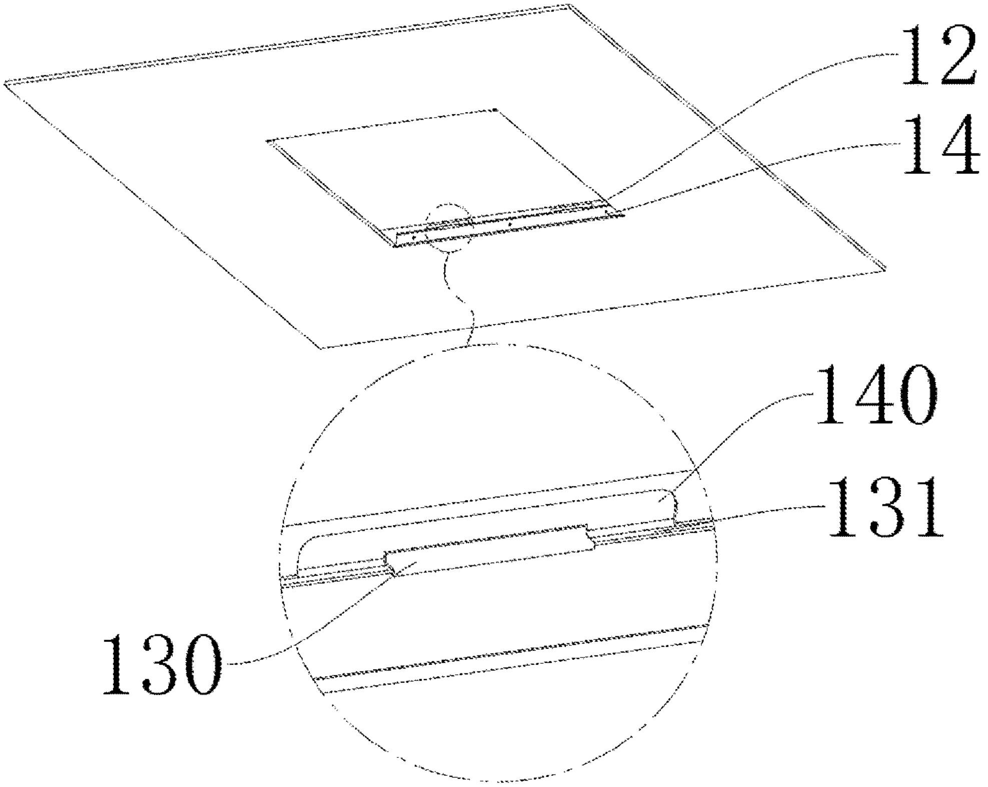
FIG. 5 is a structural diagram (II) of the lighting fixture installation area.
Figure 6:
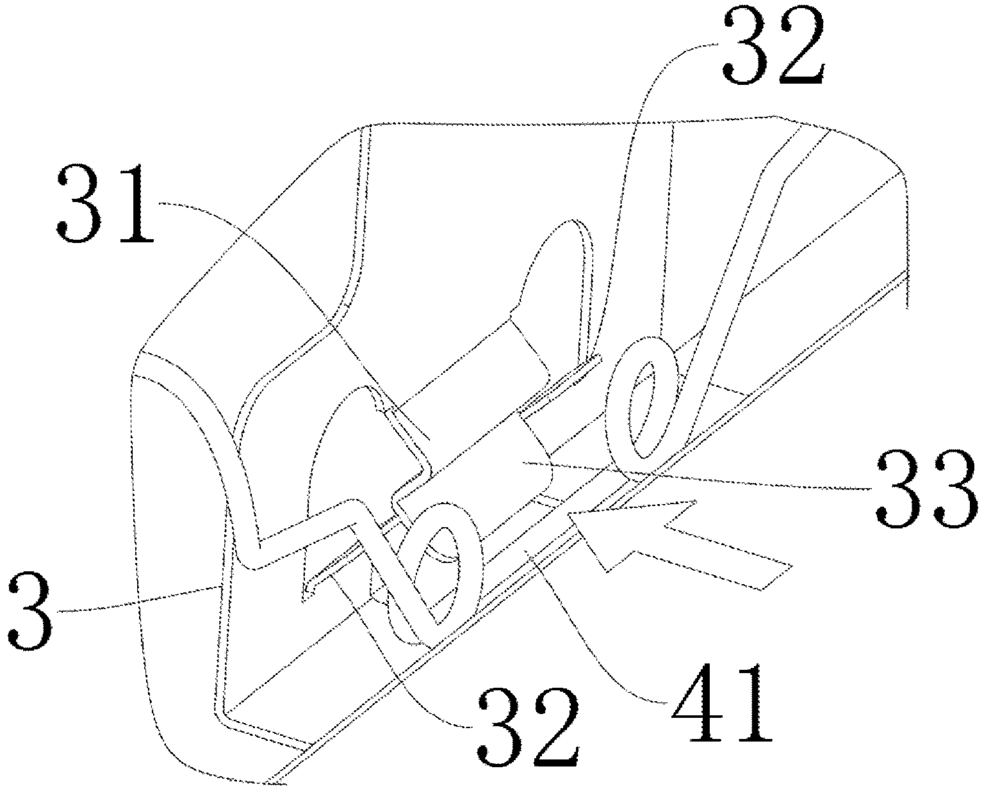
FIG. 6 is a partial structural diagram (I) of the present invention.
Figure 7:
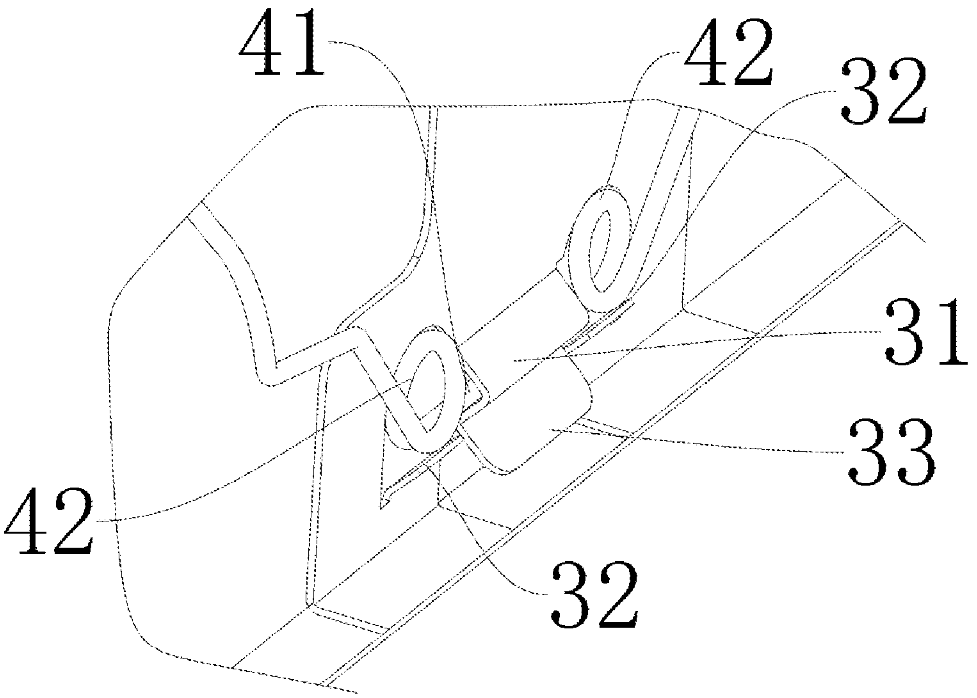
FIG. 7 is a partial structural diagram (II) of the present invention.
Figure 8:
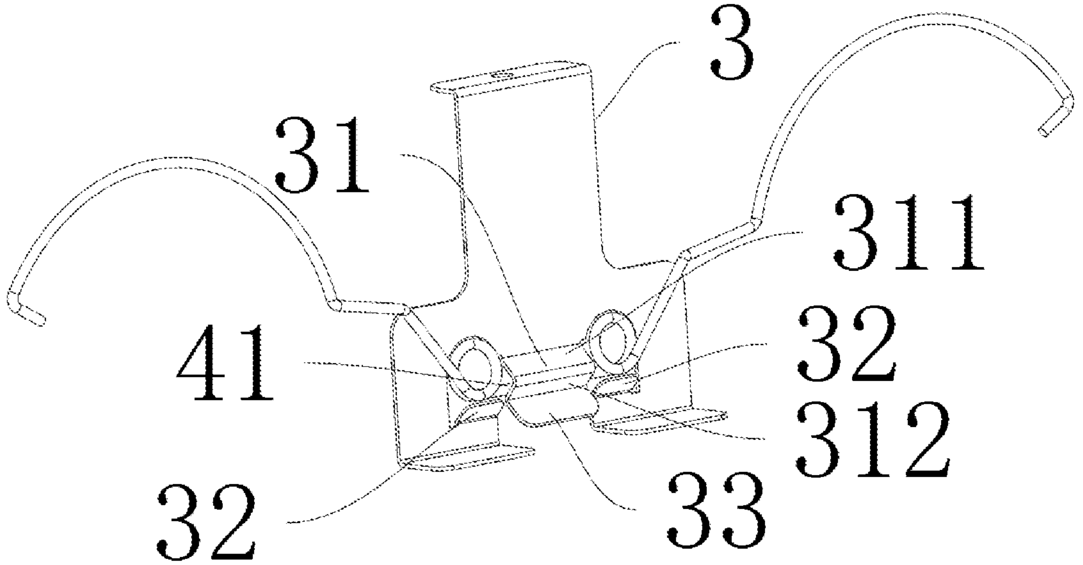
FIG. 8 is a schematic diagram of a front structure after elastic fasteners are assembled into connecting pieces.
Figure 9:
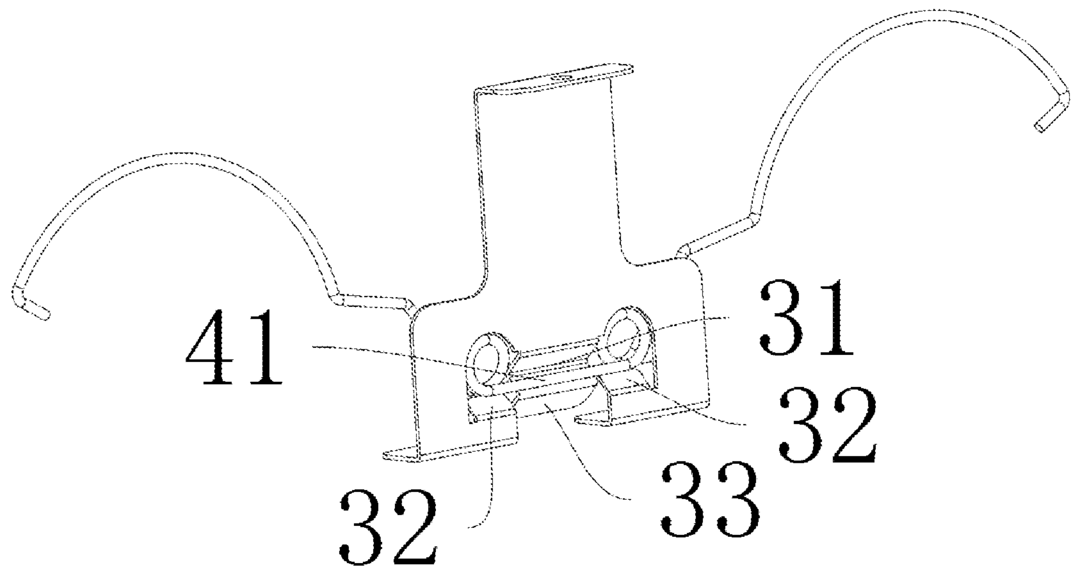
FIG. 9 is a schematic diagram of a back structure after the elastic fasteners are assembled into the connecting pieces.
Figure 10:
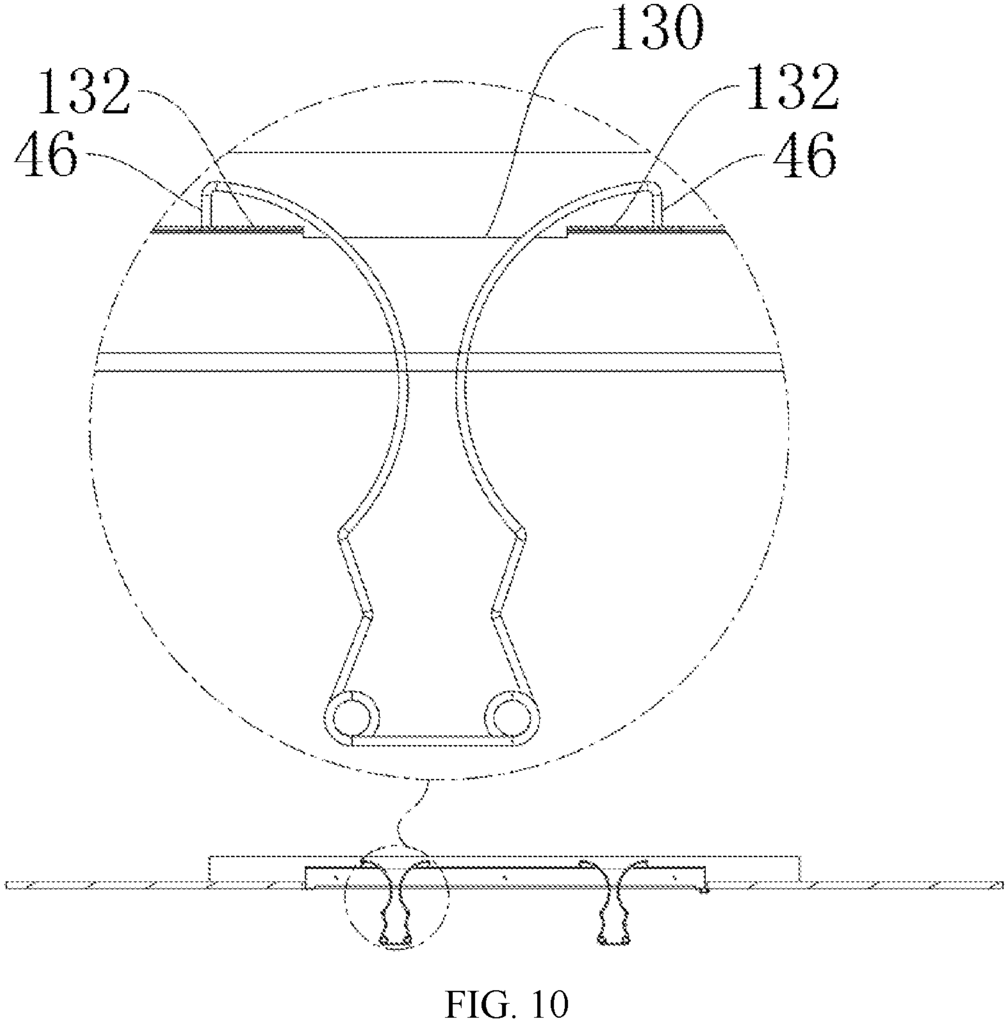
FIG. 10 is a structural diagram of hook portions clamped on clamping surfaces.
Figure 11:
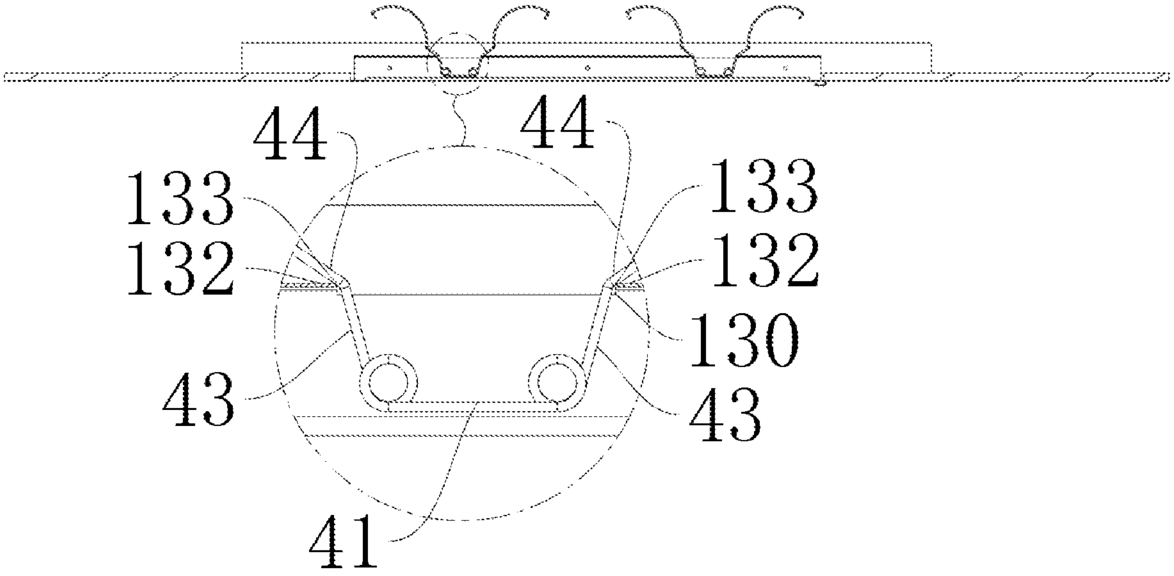
FIG. 11 is a structural diagram of elastic clamping portions clamped on opening edges.
Figure 12:
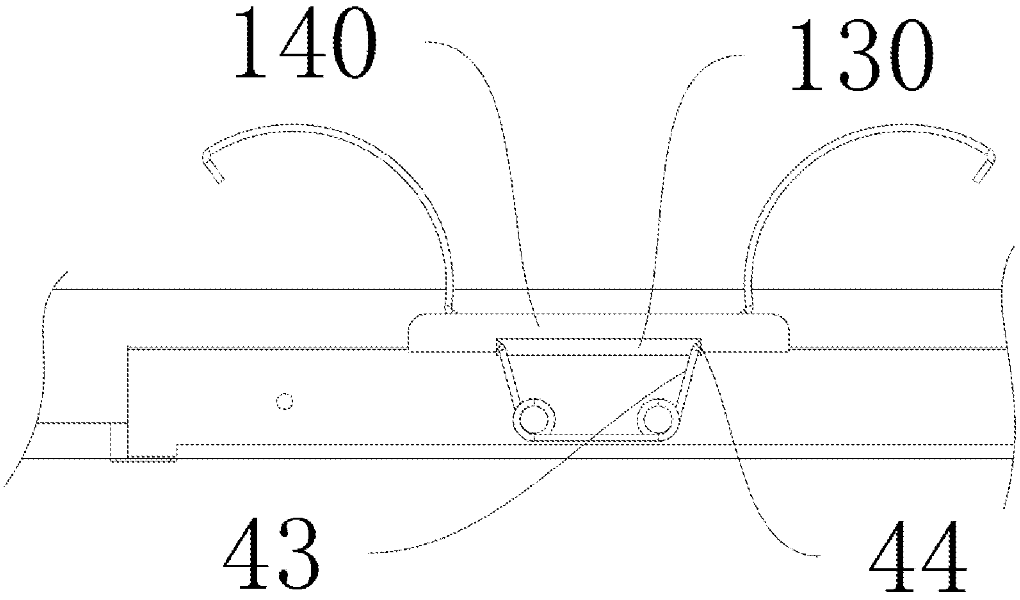
FIG. 12 is a sectional view of the elastic clamping portions clamped on the opening edges.
Figure 13:
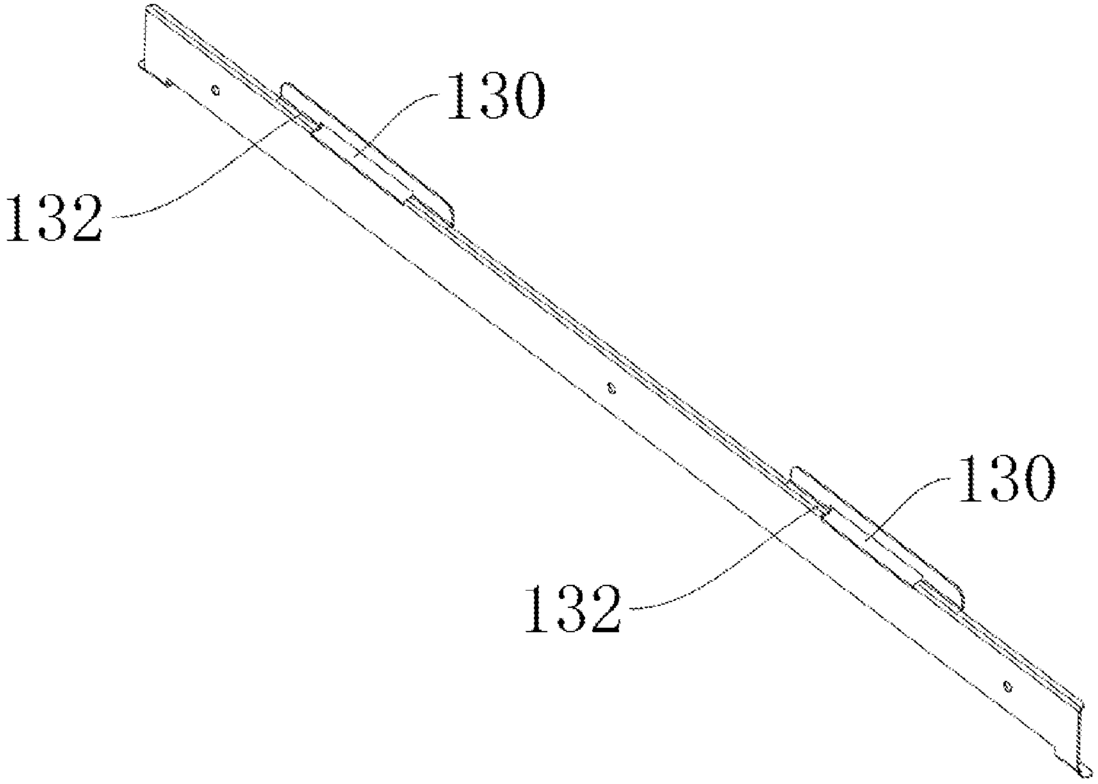
FIG. 13 is a structural diagram of a mounting plate.
Figure 14:
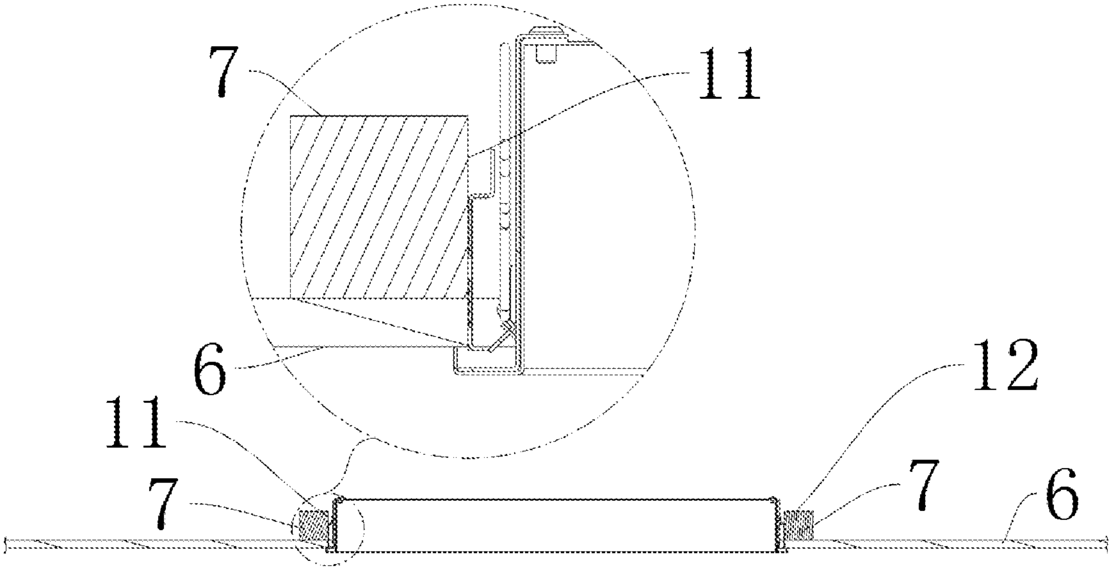
FIG. 14 is a structural diagram (I) of ceiling lighting fixture is installed on the keel frame.
Figure 15:
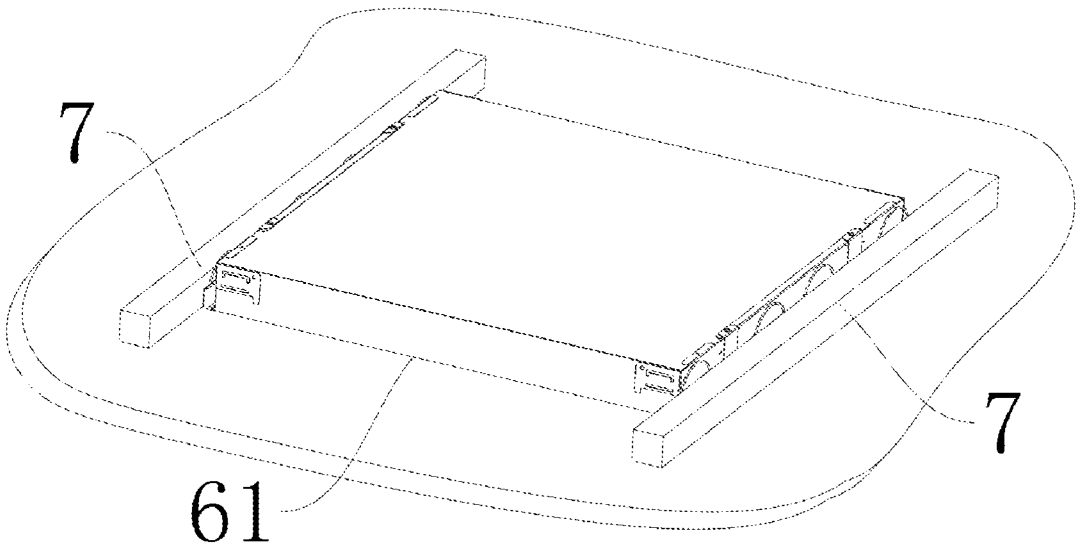
FIG. 15 is a structural diagram (II) of the ceiling lighting fixture is installed on the keel frame.

In the figures: 1. Lighting fixture installation area; 10. Mounting hole; 11. First inner wall; 12. Second inner wall; 13. First mounting plate; 14. Second mounting plate; 130. Clamping hole; 131. First mounting piece; 132. Clamping surface; 133. Opening edge; 140. Baffle; 141. Second mounting piece; 2. Ceiling lighting fixture; 21. Lighting portion; 22. First mounting portion; 23. Second mounting portion; 211. Square metal lamp housing; 212. Luminous source; 3. Connecting piece; 31. Upper spring piece; 32. Lower spring piece; 33. Extension portion; 311. Long piece portion; 312. Short piece portion; 4. First elastic fastener; 5. Second elastic fastener; 41. Clamping rod; 42. Elastomer; 43. Elastic strip; 44. Elastic clamping portion; 45. Arc-shaped bend segment; 46. Hook portion.

DETAILED DESCRIPTION OF THE PREFERRED EMBODIMENTS

The following is an exemplary description of the preferred embodiments of the present invention in combination with the embodiments shown in the drawings, so as to facilitate the understanding of the technical content of the present invention.

Embodiments

The ceiling-mounted lighting system described in an embodiment comprises a lighting fixture installation area 1 and a ceiling lighting fixture 2. The lighting fixture installation area 1 is located at a certain area of a ceiling, so a mounting hole 10 is provided on the lighting fixture installation area 1. The ceiling lighting fixture 2 comprises a lighting portion 21, and a first mounting portion 22 and a second mounting portion 23 located on the back of the lighting portion 21. The lighting portion 21 comprises a square metal lamp housing 211 and a luminous source 212 located in the square metal lamp housing 211. The luminous source 212 can be an LED lamp panel, and the mounting hole 10 is also of a square structure. Therefore, both the mounting hole 10 and the lighting portion 21 are square or rectangular, and at least one of the length and width of the lighting portion 21 is greater than those of the mounting hole 10. In addition, the first mounting portion 22 and the second mounting portion 23 are arranged opposite to each other and are metal plates protruding upward and adjacent to back edges of the square metal lamp housing 211 respectively. The metal plates and the square metal lamp housing 211 are integral sheet metal structures, while the metal plates are formed by bending upward.

The ceiling 6 is installed on a keel frame at the top of a house. The keel frame comprises two spaced keels 7, and the two keels are arranged opposite to each other. Therefore, after a square hole 61 is formed on the ceiling 6, the two keels 7 are fixed on a top surface of the ceiling 6, and side walls of the two keels 7 facing the mounting hole 10 are located flush with two opposite inner walls of the square hole 61 respectively, thus forming the mounting hole 10. A first inner wall 11 and a second inner wall 12 are formed on the mounting hole 10. The first inner wall 11 and the second inner wall 12 are arranged opposite to each other, and the side walls of the two keels facing the mounting hole serve as the first inner wall 11 and the second inner wall 12 respectively. The keels may be metallic or wooden.

The first mounting portion 22 is arranged on the same side as the first inner wall 11, and two first elastic fasteners 4 are connected to the first mounting portion. A first mounting plate 13 is fixed on the first inner wall 11 by bolts or welding, and two first mounting pieces 131 are arranged on the first mounting plate 13. The second mounting portion 23 is arranged on the same side as the second inner wall 12, and two second elastic fasteners 5 are connected to the second mounting portion. A second mounting plate 14 is fixed on the second inner wall 12 by bolts or welding, and two second mounting pieces 141 are arranged on the second mounting plate 14. Both the first mounting pieces 131 and the second mounting pieces 141 are provided with clamping holes 130. The clamping holes 130 can be prolate, and an opening edge 133 is formed at the upper end of each of the clamping holes 130.

Specifically, two connecting pieces 3 are installed on both the first mounting portion and the second mounting portion. Each of the connecting pieces 3 is provided with an upper spring 31 and two lower spring pieces 32. The upper spring piece 31 and the two lower spring pieces 32 are arranged obliquely. The two lower spring pieces 32 and the upper spring piece 31 are staggered or opposite, preferably in a staggered manner. Therefore, the two lower spring pieces 32 are respectively located on left and right sides of the upper spring piece 31, and outer ends of the upper spring piece 31 and the lower spring pieces 32 are arranged close to each other. Each of the first elastic fasteners 4 and each of the second elastic fasteners 5 comprise a clamping rod 41. The clamping rod 41 of the first elastic fasteners 4 is located between the upper spring piece 31 and the lower spring pieces 32 of the first mounting portion, and the clamping rod 41 of the second elastic fasteners 5 is located between the upper spring piece 31 and the lower spring pieces 32 of the second mounting portion to realize detachable connection between the ceiling lighting fixture 2 and the elastic fasteners. The connection between the connecting pieces 3 and the mounting portion can be fixed by welding, bolting, or riveting. The first elastic fasteners 4, the first mounting pieces 131, the second elastic fasteners 5 and the second mounting pieces 141 may be provided with only one piece. Accordingly, the connecting pieces 3 on the first mounting portion and the second mounting portion may also be provided with only one piece.

Each of the first elastic fasteners 4 and each of the second elastic fasteners 5 further comprise two elastomers 42 and an elastic strip 43 provided on each of the elastomers 42. The two elastomers 42 are respectively provided at both ends of the clamping rod 41. An upper end portion of each of the elastic strips 43 is bent to form an elastic clamping portion 44, and the included angle between the elastic strip 43 and the elastic clamping portion 44 is a right angle or an obtuse angle. An arc-shaped bend segment 45 is formed by extending an outer end of each of the elastic clamping portions 44, and a hook portion 46 is formed by extending an outer end of each of the arc-shaped bend segments 45. Preferably, each of the first elastic fasteners 4 and each of the second elastic fasteners 5 comprise one steel bar. Both ends in the middle part of the steel bar are bent and curled to form a spring, and the middle part of the steel bar segment extending on the spring is bent to form the elastic clamping portion 44. The upper part of the steel bar segment is bent in an arc shape to be the arc-shaped bend segment 45, and the upper end of the arc-shaped bend segment 45 is bent to form the hook portion 46. The middle part of the steel bar serves as the clamping rod 41. The steel bar segment is the elastic connecting strip having the elastic strip 43, the elastic clamping portion 44, the arc-shaped bend segment 45, and the hook portion 46.

When it is necessary to install the ceiling lighting fixture 2 on the ceiling, firstly gather the two elastic connecting strips on the elastic fasteners. After gathering the elastic connecting strips, included angles between the clamping rod 41 and the elastic strips 43 are acute angles, so that the maximum distance between the hook portions 46 on the elastic fasteners is less than the length of the clamping holes 130. In this way, tops of the two elastic connecting strips on the elastic fasteners pass through the clamping holes 130. At this time, the elastic connecting strips are released with the other hand, and the hook portions 46 are clamped on the clamping surfaces 132 of the mounting portion, and then the tops of the two elastic connecting strips on the remaining elastic fasteners are clamped on the mounting portion one by one according to the clamping method of the hook portions 46. At this time, the ceiling lighting fixture 2 is moved to a 6 o'clock position on the mounting hole 10, so that the clamping rod 41 of the elastic fasteners squeezes between outer ends of the two spring pieces. Under the elastic action of the two spring pieces, the clamping rod 41 is clamped between the upper spring piece 31 and the lower spring pieces 32. According to the above-mentioned installation method of the clamping rod 41, each of the connecting pieces 3 is then connected to the elastic fasteners one by one, so that the ceiling lighting fixture 2 can be suspended at the 6 o'clock position on the mounting hole 10. At this time, the ceiling lighting fixture 2 can be directly pushed upward to make the back edge of the lighting portion 21 of the ceiling lighting fixture 2 attached to the lighting fixture installation area 1, and two elastic connecting strips on each of the elastic fasteners can be unfolded under the action of the elastomers 42. After unfolding, the included angles between the clamping rod 41 and the elastic strips 43 are obtuse angles, and the included angles between the elastic clamping portions 44 and the elastic strips 43 are obtuse angles or right angles or acute angles. The elastic strips 43 are inserted into the clamping holes 130, so that the elastic clamping portion 44 on each of the elastic fasteners is clamped on the opening edge 133 of the corresponding mounting piece to facilitate installation. The elastic clamping portions 44 are inclined and clamped on the opening edges of the mounting pieces.

The ceiling lighting fixture 2 is pull down when the back edge of the lighting portion 21 is attached to the lighting fixture installation area 1, so that the ceiling lighting fixture 2 is away from the lighting fixture installation area 1, and the two elastic connecting strips of each of the elastic fasteners move downward. During the downward movement, the two elastic connecting strips of each of the elastic fasteners are extruded by the inner wall of the clamping holes 130 to get close to each other. The included angles between the clamping rod 41 and the elastic strips 43 are acute angles after the two elastic connecting strips get close to each other, and the included angles between the elastic clamping portions 44 and the elastic strips 43 are obtuse angles. The top ends of the arc-shaped bend segments 45 pass through the clamping holes 130 of the mounting pieces, while the hook portions 46 on the elastic fasteners are clamped on the clamping surfaces 132 of the mounting pieces. Finally, the two arc-shaped bend segments 45 are relatively pressed, so that the maximum distance between the two hook portions 46 on the elastic fasteners is smaller than the length of the clamping holes 130, and the elastic clamping portions 44 are in a vertical state to separate the hook portions 46 from the clamping surfaces 132 of the mounting pieces. In this way, the elastic fasteners move downward to separate from the mounting pieces. At this time, the hook portions 46 of the elastic fasteners can be separated from the mounting pieces one by one according to the above-mentioned separation method of the hook portions 46 to achieve a technical effect of more convenient disassembly, or during disassembly, only the two spring pieces can be separated to a greater extent, so that the clamping rod 41 is separated and the ceiling lighting fixture 2 can be removed.

Preferably, a section of the upper spring piece 31 is in an "L" shape, and a lower end of a short piece portion 312 of the upper spring piece 31 serves as an outer end of the upper spring piece 31. An extension portion 33 extending outwardly is formed on the outer end of the upper spring piece 31, and the extension portion 33 is arranged obliquely. Included angles between a long piece portion 311 of the upper spring piece 31 and an outer wall surface of the connecting pieces 3 and between the lower spring pieces 32 and the outer wall surface of the connecting pieces 3 are acute angles, and the extension portion 33 and the short piece portion 312 of the upper spring piece 31 are arranged perpendicular to each other. The clamping rod 41 can make the short piece portion 312 of the upper spring piece 31 tilted outward and deformed with the extension portion 33, so that the included angle between the short piece portion 312 of the upper spring piece 31 and the long piece portion 311 is increased. The locking rod 41 can then be clamped between the upper spring piece 31 and the lower spring pieces 32, and the connecting pieces 3 limit the elastomers 42 from the front side.

Preferably, the upper spring piece 31, the lower spring pieces 32, and the extension portion 33 are combined to form integral sheet metal structures with the connecting pieces 3 respectively. The upper spring piece 31, the lower spring pieces 32, and the extension portion 33 are all formed by bending.

What is claimed is:

1. A ceiling-mounted lighting system, comprising a lighting fixture installation area, a ceiling lighting fixture, first elastic fasteners and second elastic fasteners;

a mounting hole is provided in the lighting fixture installation area; the ceiling lighting fixture comprises a lighting portion, and a first mounting portion and a second mounting portion located on the back of the lighting portion; the first mounting portion and the second mounting portion are arranged opposite to each other, and the appearance of the mounting hole is the same as that of the lighting portion;

there is a first inner wall and a second inner wall on the mounting hole, and the first inner wall and the second inner wall are arranged opposite to each other;

the first mounting portion is arranged on the same side as the first inner wall, and the first mounting pieces are arranged on the first inner wall; the second mounting portion is arranged on the same side as the second inner wall, and the second mounting pieces are arranged on the second inner wall;

both the first mounting pieces and the second mounting pieces are provided with clamping holes; the first elastic fasteners are slidably connected to the clamping holes of the first mounting pieces, and connecting portions of the first elastic fasteners are detachably connected to the first mounting portion; the second elastic fasteners are slidably connected to the clamping holes of the second mounting pieces, and connecting portions of the second elastic fasteners are detachably connected to the second mounting portion; when a back edge of the lighting portion is attached to the lighting fixture installation area, an opening edge is formed at the upper end of each of the clamping holes; elastic clamping portions of the first elastic fasteners pass through the clamping holes on the first mounting pieces and are clamped on the opening edges of the first mounting pieces; elastic clamping portions of the second elastic fasteners pass through the clamping holes on the second mounting pieces and are clamped on the opening edges of the second mounting pieces.

2. The ceiling-mounted lighting system according to claim 1, wherein connecting pieces are installed on both the first mounting portion and the second mounting portion; each of the connecting pieces is provided with an upper spring piece and lower spring pieces; both the upper spring piece and the lower spring pieces are arranged obliquely; the lower spring pieces and the upper spring piece are staggered or opposite; outer ends of the upper spring piece and the lower spring pieces are arranged close to each other;

the first elastic fasteners and the second elastic fasteners both comprise a clamping rod; the clamping rod of the first elastic fasteners is located between the upper spring piece and the lower spring pieces of the first mounting portion, and the clamping rod of the second elastic fasteners is located between the upper spring piece and the lower spring pieces of the second mounting portion.

3. The ceiling-mounted lighting system according to claim 2, wherein both the first elastic fasteners and the second elastic fasteners further comprise two elastomers and elastic strips arranged on elastomers; the two elastomers are respectively arranged at both ends of the clamping rod, and the upper end of each of the elastic strips is bent to form the elastic clamping portion.

4. The ceiling-mounted lighting system according to claim 3, wherein arc-shaped bend segments are formed by extending outer ends of the elastic clamping portions, and hook portions are formed by extending outer ends of the arc-shaped bend segments; the elastic strips, the elastic clamping portions, the arc-shaped bend segments, and the hook portions are combined with each other to form integrated elastic connecting strips.

5. The ceiling-mounted lighting system according to claim 2, wherein a section of the upper spring piece is in an "L" shape, and a lower end of a short piece portion of the upper spring piece serves as an outer end of the upper spring piece; an extension portion extending outwardly is formed on the outer end of the upper spring piece, and the extension portion is arranged obliquely.

6. The ceiling-mounted lighting system according to claim 5, wherein included angles between a long piece portion of the upper spring piece and an outer wall surface of the connecting pieces and between the lower spring pieces and the outer wall surface of the connecting pieces are acute angles, and the extension portion and the short piece portion of the upper spring piece are arranged perpendicular to each other.

7. The ceiling-mounted lighting system according to claim 4, wherein in a state where the lighting portion is attached to the lighting fixture installation area, the two elastic strips of the first elastic fasteners are unfolded and inserted into the clamping holes of the first mounting pieces, and the two elastic clamping portions of the first elastic fasteners are respectively clamped on the clamping surfaces of the first mounting pieces; the included angles between the two elastic strips of the first elastic fasteners and the clamping rod of the first elastic fasteners are obtuse angles, and the included angles between the two elastic strips of the first elastic fasteners and the elastic clamping portions of the first elastic fasteners are obtuse angles, right angles or acute angles; the two elastic strips of the second elastic fasteners are unfolded and inserted into the clamping holes of the second mounting pieces, and the two elastic clamping portions of the second elastic fasteners are respectively clamped on the clamping surfaces of the second mounting pieces; the included angles between the two elastic strips of the second elastic fasteners and the clamping rod of the second elastic fasteners are obtuse angles, and the included angles between the two elastic strips of the second elastic fasteners and the elastic clamping portions of the second elastic fasteners are obtuse angles, right angles or acute angles.

8. The ceiling-mounted lighting system according to claim 4, wherein in a state where the lighting portion is far away from the lighting fixture installation area, the two elastic connecting strips of the first elastic fasteners are close to each other and inserted into the clamping holes of the first mounting pieces, and the hook portions on the first elastic fasteners are clamped on the clamping surfaces of the first mounting pieces; the included angles between the two elastic strips of the first elastic fasteners and the clamping rod of the first elastic fasteners are acute angles, and the included angles between the two elastic clamping portions of the first elastic fasteners and the elastic strips of the first elastic fasteners are obtuse angles; the two elastic connecting strips of the second elastic fasteners are close to each other and inserted into the clamping holes of the second mounting pieces, and the hook portions on the second elastic fasteners are clamped on the clamping surfaces of the second mounting pieces; the included angles between the two elastic strips of the second elastic fasteners and the clamping rod of the second elastic fasteners are acute angles, and the included angles between the two elastic clamping portions of the second elastic fasteners and the elastic strips of the second elastic fasteners are obtuse angles.

9. The ceiling-mounted lighting system according to claim 8, wherein a first mounting plate is fixed on the first inner wall and a second mounting plate is fixed on the second inner wall; the first mounting pieces are arranged on the first mounting plate and the second mounting pieces are arranged on the second mounting plate.

10. The ceiling-mounted lighting system according to claim 9, wherein both the mounting hole and the lighting portion are of a square structure, and at least one of the length and width of the lighting portion is greater than those of the mounting hole.

11. The ceiling-mounted lighting system according to claim 10, wherein inside edges of the first mounting pieces and the second mounting pieces extend upward to form baffles.

12. The ceiling-mounted lighting system according to claim 10, wherein the lighting fixture installation area comprises a ceiling and a keel frame; the keel frame comprises two spaced keels arranged opposite each other; after a square hole is formed in the ceiling, the two keels are fixed on a top surface of the ceiling, and side walls of the two keels facing the mounting hole are located flush with two opposite inner walls of the square hole respectively; the square hole forms the mounting hole with the two keels, and the side walls of the two keels facing the mounting hole serve as the first inner wall and the second inner wall respectively.

* * * * *